UNITED STATES PATENT OFFICE.

ALBERT SICHEL, OF NEW YORK, N. Y.

ZINC-FOIL AND METHOD OF MANUFACTURING THE SAME.

SPECIFICATION forming part of Reissued Letters Patent No. 11,241, dated May 24, 1892.

Original No. 473,790, dated April 26, 1892. Application for reissue filed April 30, 1892. Serial No. 431,604.

*To all whom it may concern:*

Be it known that I, ALBERT SICHEL, of the city, county, and State of New York, have invented a new and useful article of manufacture—viz., zinc-foil thin, flexible, and pliable enough to be used as foil for wrappers, such as the ordinary tin or compound foil of commerce is now used for; and I do hereby declare that the following is a full, clear, and exact specification of the same and of the manner of its production.

I have discovered that zinc can be rolled as thin as, and indeed thinner than, the ordinary lead, tin, or compound foil of commerce, and that when rolled to this exceeding thinness it will retain the strength and will have imparted to it the flexibility and pliability requisite to enable it to be used for wrappers.

It has been known in a general way for some years that zinc, notwithstanding its high crystalline structure, is under certain conditions of heat and the like malleable to an extent which will permit it to be drawn into wire or made into sheets or comparatively thin "leaves," as they may be called for want of a better name. The thinnest leaf-zinc, however, of which I have knowledge is one-tenth of a millimeter, or about four one-thousandths of an inch in thickness. Such a material is stiff and wholly unfitted for use as a wrapper, and is not in any true sense foil. The difference between any such thin sheet or leaf zinc and the zinc-foil of my invention will be indicated by the fact that under my invention, starting, for instance, with a zinc sheet .002 of an inch in thickness—that is to say, a sheet one-half the thickness of any heretofore produced of which I have knowledge and which when even of this comparative thinness is still unsuitable for use as a wrapper—I reduce that sheet by successive operations to a thickness of, say, from one two-thousandths to one four-thousandths of an inch, these limits not being absolute, but being here stated in order to illustrate the extent to which the reduction must be carried in order to produce a foil suitable for wrappers. The ordinary straight-rolling process is wholly inadequate to produce this result. Zinc when thus rolled becomes stringy, weak, full of small holes, and hence entirely unfit for use. What is required is that with the reduction of thickness the metal shall be evenly condensed with a body that is solid, free from openings or holes, however minute, and capable of being bent and folded in any and all directions without danger of fracture or break. This I find can be accomplished by a process of cross folding and rolling, which I will now proceed to describe, in order to acquaint others skilled in the art with the best way known to me of producing the article in which my invention is comprised. I may here state that with zinc mined in the State of Virginia and bearing the brand "Bertha," I have rolled excellent zinc-foil one four-thousandths of an inch in thickness from the ingot without heating or annealing the metal at any time during the operation. Starting, for example, with sheet-zinc about .025 or one-fortieth of an inch thick I reduce this sheet to about .002 of an inch in thickness, which is about one-half the thickness of any sheet-zinc heretofore known to me. To accomplish this, I proceed in the following manner, assuming, for the purpose of illustration only, that the sheet is sixteen inches square: I pass the sheet through between rolls and reduce it gradually until it is twenty-four inches long, and then I cut it in half, so as to get two sheets, each twelve by sixteen inches. I lay these sheets one upon the other and then fold them in the middle, thus producing a package of eight by twelve inches. I pass this package through between rolls, presenting the closed or folded end to the rolls, and gradually reduce it until the package is about twelve inches long. I then cut or shear off the closed end and fold the package, as before; but so that the line of fold is at right angles with that of the previous fold, which has just been sheared off. I then roll this package, (which measures now about six by twelve inches,) presenting the closed or folded end to the rolls until it is lengthened to about nine inches. I repeat these operations of cross-rolling and cross-folding until I obtain sheets of about .002 of an inch.

The object of this method of folding and rolling is that after every folding each sheet of the newly-formed package shall pass through between the rolls in a direction transverse or approximately at right angles to that in which it had passed through in the preceding package. It is only in this way that I can obtain the result I aim at.

If at any time the metal should appear brittle, it should be heated to about 212° Fahrenheit, and at that temperature be presented to the rolls. This refers to the sheet with which I start as well as to the packages already referred to, and those hereinafter described at any stage. Whenever the edges show signs of breaking or when they are not in line with one another, they should be trimmed.

I remark here that, so far as I have been able to determine, it is necessary, in order to obtain a good zinc-foil, that the thick sheet (supposed to be one-fortieth of an inch thick) with which I start to make the foil should be produced by a process of cross-rolling from the ingot itself. Of the various sheet-zincs in the market which are known to me none of them, so far as I have been able to ascertain, is fitted for the production of the foil. I have tried, for example, to make foil from the softest German sheet-zinc obtainable by me in the German market—a zinc nineteen one-hundredths of a millimeter in thickness—and I have found that the moment it is perceptibly reduced, even by cross rolling and folding, it takes on the appearance of a net full of regular holes and looking like crochet-work.

Having thus obtained zinc leaves about .002 of an inch thick, then, in order to produce the zinc-foil of my invention, I proceed as follows: I take, say, four comparatively-thick sheets of zinc, each about .025 of an inch thick, and for purposes of illustration I assume them to be twelve by eighteen inches in size. I lay them one on the other with their edges coinciding and fold them in the middle to produce a package or book of eight leaves, each twelve by nine inches. I then take fourteen sheets of the thin leaves .002 of an inch thick and twelve by nine inches, produced as already described, and put two sheets of the thin between each two leaves of book or package formed by the thick. I then present the closed end of this package to the rolls and pass the package through them until it has been lengthened about fifty per cent., or, in other words, until it is about thirteen and one-half inches long. I then trim the free edges, cut or shear off the folded edge, fold the package the other way, and thus repeat the operation by successive cross foldings and rollings until the thin sheets interleaved between the thicker ones have become reduced to the thinness which I desire to produce. Whenever the surface of the outer sheet of the package appears to become rough or shows slight signs of breaking, the package should at once be put between the leaves of a folded fresh sheet of the thick zinc, (.025 of an inch thick,) after which the rolling is continued as before. I find this always advisable when the sheets have grown thin. I have also found that when the sheets have thus grown thin and the package has been put between the folds of a fresh sheet of heavy zinc I can lengthen the package more than fifty per cent. before refolding it. I have, in the manner above described, produced sheets of zinc-foil of about one four-thousandths of an inch in thickness. Zinc-foil can thus be produced as thin as the very thinnest of the foils of commerce used for wrappers.

Metallic-foil wrappers are used to wrap packages of tobacco, cigars, candies, soap, &c. The metallic foil mostly used for these purposes is made of tin or of a core of lead with surface of tin.

Pure tin is expensive. Moreover, if rolled very thin, either in the pure state or even slightly alloyed with some metal, such as antimony, it is rather frail for wrappers, except for very small packages or for solids which require little or no strength in the wrapper. Compound foil—that is to say, foil made of lead core with tin surfaces—to be suitable for wrappers must not be rolled very light or thin, for in that case it would be entirely too frail.

The rolled zinc-foil produced in the manner hereinbefore indicated by me is very thin. It is made from inexpensive metal. In common with other metallic-foil wrappers it is impervious to air and moisture, and it possesses weight for weight a strength which is not found in other foil wrappers. It would require, for example, a sheet of compound foil several times the weight of the sheet of zinc-foil to have the same strength and durability as the latter. What the effect is of the successive cross foldings and rollings upon the original crystalline structure of the zinc I am not able to state. I only know that as the result of these operations I obtain a very thin light-weight strong zinc-foil, apparently homogeneous and without flaw or break in its body, and yet pliable and flexible enough to be admirably adapted for a wrapper in place of the ordinary tin and compound foils now in use for that purpose.

Having described my invention and the best way now known to me of carrying the same into effect, what I claim, and desire to secure by Letters Patent, is—

1. As a new article of manufacture, zinc-foil thin, flexible, and pliable enough to be used as a wrapper, substantially as hereinbefore set forth.

2. The method of manufacturing zinc-foil, consisting in placing sheet-zinc in packs and subjecting the packs to successive cross-rollings and cross-foldings in the manner hereinbefore set forth.

In testimony whereof I affix my signature in presence of two witnesses.

ALBERT SICHEL.

Witnesses:

PHILIP NETTRE,
SARAH MULLEN.